Figure 1:
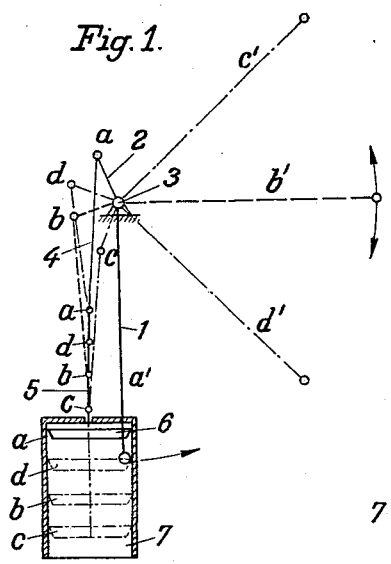

Dec. 22, 1931.   A. BUSSENIUS   1,837,700

DIRECTION INDICATOR

Filed Aug. 24, 1928

Albert Bussenius  Inventor:

Patented Dec. 22, 1931

1,837,700

UNITED STATES PATENT OFFICE

ALBERT BUSSENIUS, OF DRESDEN, GERMANY

DIRECTION INDICATOR

Application filed August 24, 1928. Serial No. 301,896.

The present invention relates to a direction indicator provided with a signal arm to be released from the driver's seat. It is known that direction indicators exist which can be caused, by means of a mechanism, to change from their motionless position to a rigid, spread out position. If spread out, these known direction indicators affect a horizontal position; furthermore, these indicators, in the motionless position, acquire a vertical position and point downwards. In the horizontal position they are sustained by means of the mentioned mechanism. These known direction indicators do not satisfy any more the demands of the heavy traffic of today as they do not adequately draw the attention of the pedestrians and of the other vehicles. The present invention comprises, in opposition to the above mentioned devices, a direction indicator that, prior to acquiring the horizontal position, swings for a considerable time up and down in a pendulum like manner. For this purpose the arm or pointer, even in its idle position, is subject to a power, which upon releasing an arresting arrangement, is set free by the driver of the vehicle and carries the arm to the horizontal position. According to the invention, the arm does not remain however in the horizontal position, but due to the action of the actuating power and to its own gravity, both counter-acting each other, the arm swings up and down for some time prior to attaining its horizontal position; these pendulum-like motions draw the attention of the traffic to the direction indicator in a far greater degree than all the systems known up to date. For this purpose, the signal arm is constructed as a double-armed lever, one arm thereof acting as the direction arm proper, whereas the other arm is coupled with a mechanism that exercises a motive power upon the arm, even if same is in a vertical position. Such a mechanism can actuate, for example, a piston the piston rod of which is coupled to the second arm of the indicator, said piston sliding in a cylinder hermetically closed at one end. In the vertical position of the arm, the enclosed air confined between the piston and cylinder is compressed, and whenever the arm is released by suitable means, the air expands and presses the piston. The said piston is pushed forward in the cylinder and carries the arm to the horizontal position; the momentum accruing from weight of the arm causes the latter to swing beyond the vertical position. Thus, the air confined between piston and cylinder expands and creates within the cylinder a diminished pressure compared with the outer atmosphere. The atmosphere therefore enters into play to press the piston and moves it back to the horizontal position; the momentum of the arm acts again in the opposite direction and the air within the cylinder is again compressed. In this manner the air compressed within the cylinder, the outer atmosphere and the weight of the direction arm counteract each other periodically. The various positions of the direction indicator can be controlled by shortening or lengthening the piston rod or by extending or reducing the size of the cylinder chamber.

Figure 2:
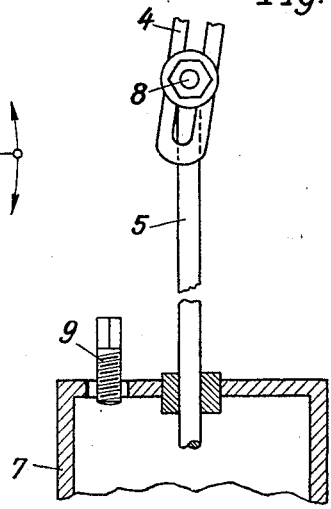
Figure 3:
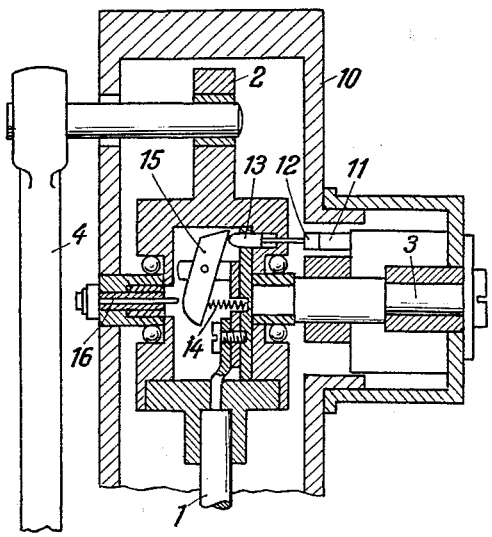

One form of the invention is illustrated in the accompanying drawings, in which Figure 1 is a diagram of the direction indicator in connection with a piston and air cylinder; Fig. 2, a view on an enlarged scale of the connection of the direction indicator with the piston; Fig. 3 is a section on an enlarged scale of the rotation axis of the indicator when in a position of rest.

The direction indicator is executed as a double lever. Referring to the drawing, lever 1 is the indicating arm. 2 is the other arm of the double lever, which swings in an arc pendulum-like about the axis 3. By means of a lever 4 the shorter arm 2 is connected with a piston rod 5 to the lower end of which a piston 6 is attached which slides in the cylinder 7 having an open bottom. The lever 4 and the piston rod 5 are adjustable relative to each other and can be fixed in position by the set screw 8. Within the cylinder 7 an adjusting device 9 such as a set screw is provided which can be screwed into the inside of the cylinder to any desired depth.

The device functions as follows:

For example, the signal arm 1 is in a position of rest pointing vertically downwardly (position $a$, Fig. 1), in which position the arm is held by means of a locking device not shown.

If the indicator is now released from the driver's seat, the layer of air previously compressed in the cylinder chamber 7 above the piston 6 shows a tendency to expand, and the piston 6 goes down, past its central position $b$, into position $c$, when it will swing back into the position $d$ and continue to swing to and fro until it finally comes to a full stop in the central position $b$. The other mechanisms, above all, the weight of the arm 1 and the outer atmosphere cooperate in this movement, the arm 1 taking the successive corresponding positions $a'$, $b'$, $c'$, $d'$.

The central position $b'$ as well as the other positions $a'$, $c'$, and $d'$ can be varied by adjusting the lever 4 and the piston rod 5 relative to each other or by increasing or reducing the size of the cylinder chamber 7 by means of the screw bolt 9.

Having been actuated the direction indicator is returned to its position of rest (position $a$, Fig. 1) by means of a lifting device such as a bow or spring mechanism (not shown) and held in position by a locking device of known type. Simultaneously, the piston 6 returns to its highest position and compresses accordingly the air in front of it within the cylinder chamber.

I claim:—

1. A direction indicator for vehicles provided with a signal arm to be released by the driver of the vehicle, comprising, in operative combination, a double-armed lever, one arm of the lever being formed as a signal arm, a piston rod, a piston, and a cylinder for the said piston, the cylinder being closed at one end to form a chamber enclosing air, the remaining free arm of the said lever being connected with the said piston rod and piston, the air enclosed between the piston and the cylinder being compressed in the non-working position of the signal-arm and the signal arm being released swinging pendulum like to and fro under the influences of the expanding air enclosed in said chamber, of its weight and the outer atmosphere until the arm regains its equilibrium.

2. In a direction indicator for vehicles, a signal arm formed as a double armed lever, suspension means for said signal arm adapted to permit the weight thereof to swing the same past a given predetermined operative position, and means co-operating with the weight of the arm to impart to said signal arm a pendulum-like motion, said means being connected to one arm of the signal.

3. In a direction indicator according to claim 1 screw means adapted to shorten or lengthen at will the piston rod to control the various end positions of the indicator.

In witness whereof I have hereunto set my hand.

ALBERT BUSSENIUS.